US009029777B2

(12) United States Patent
Oda et al.

(10) Patent No.: US 9,029,777 B2
(45) Date of Patent: May 12, 2015

(54) IMAGING SYSTEM AND IMAGING METHOD

(71) Applicants: NEC Corporation, Tokyo (JP); Nippon Avionics Co., Ltd., Tokyo (JP); Osaka University, Osaka (JP)

(72) Inventors: Naoki Oda, Tokyo (JP); Takayuki Sudou, Tokyo (JP); Shuichi Ohkubo, Tokyo (JP); Goro Isoyama, Osaka (JP); Ryukou Kato, Osaka (JP); Akinori Irizawa, Osaka (JP); Keigo Kawase, Osaka (JP)

(73) Assignees: NEC Corporation, Tokyo (JP); Nippon Avionics Co., Ltd., Tokyo (JP); Osaka University, Osaka (JP)

(*) Notice: Subject to any disclaimer, the term of this patent is extended or adjusted under 35 U.S.C. 154(b) by 0 days.

(21) Appl. No.: 14/183,548

(22) Filed: Feb. 19, 2014

(65) Prior Publication Data

US 2014/0232931 A1 Aug. 21, 2014

(30) Foreign Application Priority Data

Feb. 19, 2013 (JP) .................................. 2013-030165

(51) Int. Cl.
 *G01J 5/02* (2006.01)
 *H04N 5/232* (2006.01)
 *H04N 5/225* (2006.01)

(52) U.S. Cl.
 CPC ............. *H04N 5/232* (2013.01); *H04N 5/2256* (2013.01)

(58) Field of Classification Search
 USPC .......................................... 250/340; 348/371
 See application file for complete search history.

(56) References Cited

U.S. PATENT DOCUMENTS

| 2010/0073665 | A1* | 3/2010 | Zhao et al. ........................ 356/36 |
| 2011/0297829 | A1* | 12/2011 | Altmann et al. ............... 250/332 |
| 2012/0249782 | A1* | 10/2012 | Oda et al. ........................ 348/135 |
| 2013/0208142 | A1* | 8/2013 | Inoue et al. ................. 348/231.7 |
| 2013/0278749 | A1* | 10/2013 | Mandelis et al. ............... 348/87 |
| 2014/0085449 | A1* | 3/2014 | Mandelis et al. ............... 348/77 |

FOREIGN PATENT DOCUMENTS

JP  2012-205217  10/2012

OTHER PUBLICATIONS

Author: Christin Brandli et al., Title: Adaptive pulsed laser line extraction for terrain reconstruction using a dynamic vision sensor, Date: Jan. 2014, Publisher: Frontiers in Neuroscence, vol. 7.*

(Continued)

*Primary Examiner* — David J Makiya
*Assistant Examiner* — Taeho Jo
(74) *Attorney, Agent, or Firm* — Young & Thompson

(57) ABSTRACT

Provided is an imaging system, including: a light source; an imaging device; a first optical system for irradiating an imaging object with light from the light source; a second optical system for causing one of light reflected from the imaging object and light transmitted through the imaging object to enter the imaging device; a control device for controlling the light source to irradiate the light with a predetermined period; and a processing device for acquiring time-series image data over a plurality of frames by controlling the light source to irradiate the light with the predetermined period, and allocating a maximum pixel intensity among the time-series pixel data of each pixel as pixel data of the each pixel to thereby obtain first image data when the light source irradiates the light.

18 Claims, 7 Drawing Sheets

(56) References Cited

OTHER PUBLICATIONS

Author: Steven Bailey et al., Title:Advances in HgCdTe APDs and LADAR Receivers, Date: Apr. 2010, Publisher: SPIE Defense Security and sensors.*

Author: X. Yin et al., Title: Terahertz Imaging for Biomedical Applications: Pattern Recognition and Tomographic Reconstruction, Date: 2012, Publisher: Springer Science+Business Media.*

Naoki Oda et al., "Real-Time Transmission-type Terahertz Microscope, with Palm size Terahertz Camera and Compact Quantum Cascade Laser", Proceeding of SPIE, vol. 8496, 84960Q (2012).

* cited by examiner

IMAGING SYSTEM AND IMAGING METHOD

This application is based upon and claims the benefit of priority from Japanese patent application No. 2013-30165, filed on Feb. 19, 2013, the disclosure of which is incorporated herein in its entirety by reference.

BACKGROUND OF THE INVENTION

1. Field of the Invention

This invention relates to an imaging system and an imaging method.

2. Description of the Related Art

In recent years, lock-in imaging technology for acquiring an image in synchronization with ON/OFF of a light source has been developed. The related art is, for example, Japanese Unexamined Patent Application Publication (JP-A) No. 2012-205217 (hereinafter referred to as "Patent Literature 1") and N. Oda et al., Proceedings of SPIE, Vol. 8496, 84960Q (2012) (hereinafter referred to as "Non Patent Literature 1").

Patent Literature 1 relates to an imaging device that includes a light source and a camera and is designed so that a measurement object is placed in an optical path therebetween. More particularly, Patent Literature 1 relates to an imaging device for imaging a measurement object in synchronization with a predetermined period of a light source.

As described above, Patent Literature 1 is the imaging device that includes the light source and the camera and is designed so that the measurement object is placed in the optical path therebetween. In this imaging device, the measurement object is imaged in synchronization with the predetermined period of the light source (so-called lock-in imaging), and hence an image resulting from radiation other than the light source can be eliminated and low frequency noise such as l/f noise is cancelled out.

Referring to FIG. 2, a description is given of an example of the lock-in imaging technology described in Patent Literature 1.

A Sync signal 101 determining a frame rate of a terahertz (THz) camera 100 is input to a frequency divider 102 to divide the frequency by $2^n$ (n=1, 2, . . . ). Although not illustrated, the selection of n is switched by a dual in-line package (DIP) switch, for example. A synchronization signal 103 obtained by the frequency divider is input to an AND circuit 106 included in a controller 105 for a THz light source 104 called quantum cascade laser (QCL). AND operation is performed on the synchronization signal 103 and a pulse 108 output from a high voltage pulse power source 107 to produce a QCL drive pulse 109.

The drive pulse 109 is input to a drive circuit 110 so as to irradiate the light from the light source 104 with the predetermined period, thereby irradiating a sample 111 with a THz wave 112. The THz wave 112 reflected on the sample 111 is detected by the THz camera 100 to be converted into an image. Although FIG. 2 illustrates the arrangement in a reflection mode, the lock-in imaging technology is also applicable to the arrangement in a mode in which the THz wave is transmitted through the sample.

Data acquired by the camera 100 is input to an image data acquisition device 113. A CPU 114 included in the image data acquisition device 113 stores in a buffer 115 image data measured in an irradiated period of the THz light source 104, image data measured in an unirradiated period thereof, and difference image data therebetween. A phase compensation circuit 116 compensates for a phase shift caused by a circuit included in the THz camera 100, thereby serving to acquire an image in synchronization with a predetermined timing of the THz light source 104.

FIG. 3 shows a lock-in image 200 acquired in this way.

The lock-in image 200 was acquired in the transmission mode, and the sample 111 was a hair placed under paper. The quantum cascade laser light source 104 having a frequency of 2 THz was irradiated the light with a predetermined period at a lock-in frequency of 3.75 Hz to irradiate the sample 111 with the THz wave 112, and the transmitted THz wave 112 was imaged by the THz camera 100 to acquire the lock-in image 200. Specifications in imaging were four times of frame integration and spatial filtering of 3×3 pixels. An absorption image 201 resulting from the hair is observed. A concentric pattern 202 is considered to result from interference inside the optical system caused by high coherency of the quantum cascade laser.

SUMMARY OF THE INVENTION

However, when the lock-in imaging technology described in Patent Literature 1 is applied to a THz light source that generates a THz wave from an accelerator, a problem arises in that a proper image cannot be acquired due to loss of synchronization. The example is given below to describe the reason and clarify the problem.

A large-sized device such as an accelerator, for example, a free electron laser (FEL) device at the Institute of Scientific and Industrial Research, Osaka University, uses an AC power frequency of 60 Hz to control the period, duty cycle, and the like of a THz light source for a THz wave radiated from the device. This light source is hereinafter referred to as "THz-FEL".

On the other hand, the THz camera (IRV-T0831), the product of NEC Corporation, generates a frame rate frequency by a circuit inside the camera, and hence a slight difference is generated between the period of the THz-FEL light source and the frame rate of the camera. The THz-FEL device uses an AC power frequency of 60 Hz to radiate a THz at a period of 10 Hz.

In contrast, the frame rate of the camera is created by an internal oscillator to be 59.75 Hz, which deviates slightly from 60 Hz. FIG. 4 shows some images acquired under those conditions.

An image 300 seems to be acquired in synchronization. However, when the phase gradually shifts, the image 300 changes to an image 301 in which the signal intensity is weak in part or an image 302 in which the entire signal intensity is small. Thus, a problem arises in that an image to be acquired when the light source irradiates the light and an image to be acquired when the light source does not irradiate the light cannot be clearly discriminated from each other to fail in acquiring an accurate lock-in image. In particular, this problem is noticeable when an irradiated duration of the light source is extremely shorter than a time constant of the sensor.

It is an object of this invention to provide an imaging system and an imaging method capable of reproducing (constructing) an original image signal based on an image signal acquired in an asynchronous state when an emission period of a light source and a frame period of a camera are slightly out of synchronization (are not in an integer multiple relationship).

According to one aspect of the present invention, there is provided an imaging system, including:
 a light source;
 an imaging device;

a first optical system for irradiating an imaging object with light from the light source;

a second optical system for causing one of light reflected from the imaging object and light transmitted through the imaging object to enter the imaging device;

a control device for controlling the light source to irradiate the light with a predetermined period; and a processing device for acquiring time-series image data over a plurality of frames by controlling the light source to irradiate the light with the predetermined period, and allocating a maximum pixel intensity among the time-series pixel data of each pixel as pixel data of the each pixel to thereby obtain first image data when the light source irradiates the light.

Further, according to another aspect of the present invention, there is provided an imaging system, including:

a light source;

an imagine device;

a first optical system for irradiating an imaging object with light from the light source;

a second optical system for causing one of light reflected from the imaging object and light transmitted through the imaging object to enter the imaging device; and a processing device for acquiring one image data in which all pixels have pixel intensities that are measured within one frame period after the imaging object is irradiated with the light as first image data, and correcting, with use of second image data when the light source does not irradiate the light and the first image data, an output decrease caused by a sensor thermal time constant of the imaging device to thereby obtain image data.

Further, according to another aspect of the present invention, there is provided an imaging method, including:

irradiating an imaging object with predetermined light from a light source;

causing one of light reflected from the imaging object and light transmitted through the imaging object to enter an imaging device;

acquiring a predetermined number of pieces of time-series image data over a plurality of frames by controlling the light source to irradiate the light with a predetermined period;

selecting, for each pixel, a maximum pixel intensity from among the acquired predetermined number of pieces of time-series image data; and obtaining, based on the maximum pixel intensity for the each pixel, one final image data as first image data when the light source irradiates the light.

Further, according to another aspect of the present invention, there is provided imaging method, including:

irradiating an imaging object with predetermined light from a light source;

causing one of light reflected from the imaging object and light transmitted through the imaging object to enter an imaging device;

acquiring first image data when the light source irradiates the light, all pixels having pixel intensities that are measured when an elapsed time from the irradiation of the light is one frame period or less;

acquiring second image data by controlling the light source not to irradiate the light; and taking a difference between the first image data and the second image data for each pixel to calculate pixel amplitude and correct an attenuation ratio of the pixel amplitude.

Further, according to another aspect of the present invention, there is provided an imaging method, including:

irradiating an imaging object with light from a light source;

causing one of light reflected from the imaging object and light transmitted through the imaging object to enter an imaging device; and acquiring final image data when the light source irradiates the light, under such a state that a predetermined period of the light source and a frame period of the imaging device are out of synchronization.

DETAILED DESCRIPTION OF THE PREFERRED EMBODIMENTS

Now embodiments of this invention are described in detail with reference to the accompanying drawings.

Figure 1:
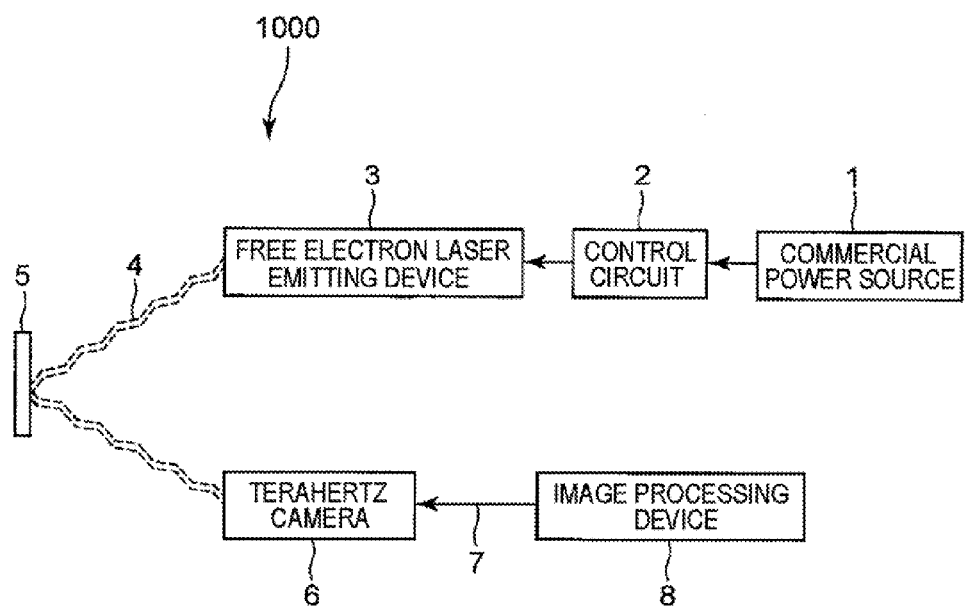
FIG. 1 is a diagram illustrating a configuration of an imaging system according to embodiments of this invention.

First referring to FIG. 1, the outline of the embodiments of this invention is described. FIG. 1 is a diagram illustrating a configuration of an imaging system according to the embodiments of this invention.

As illustrated in FIG. 1, an imaging system 1000 includes a commercial power source 1, a control circuit 2 connected to the commercial power source 1, a free electron laser emitting device (light source) 3 connected to the control circuit 2, a sample (imaging object) 5, a terahertz camera (imaging means) 6, and an image processing device 8 connected to the terahertz camera 6. The imaging system 1000 further includes a first optical system for irradiating the sample 5 with light from the free electron laser emitting device 3 and a second optical system for causing light reflected from or transmitted through the sample 5 to enter the terahertz camera 6.

Figure 2:
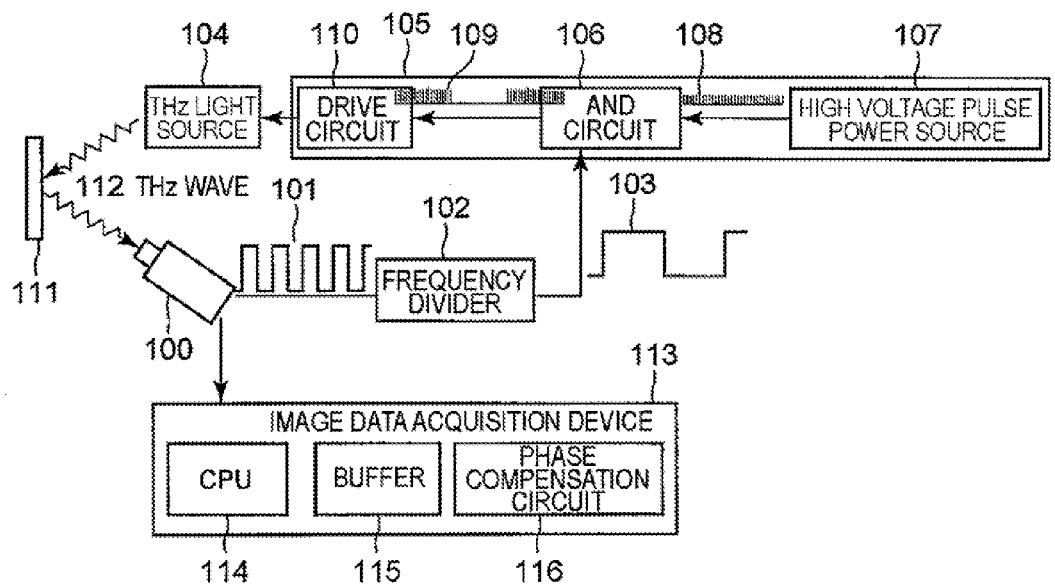
FIG. 2 is a diagram illustrating an example of a configuration of an imaging system described in Patent Literature 1.
Figure 3:
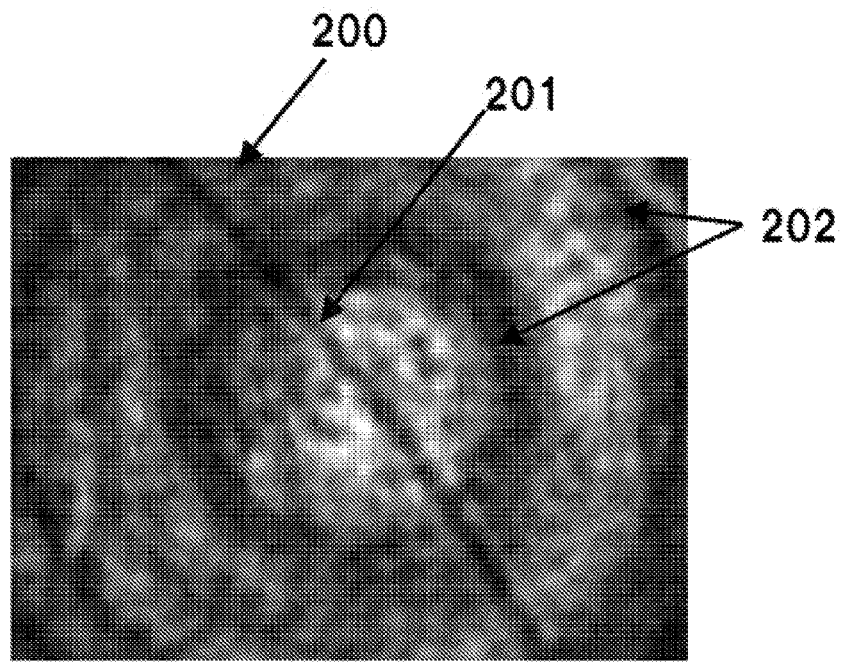
FIG. 3 is a photograph showing an example of an image acquired by the imaging system described in Patent Literature 1.

With this configuration, the emission period of terahertz light 4 radiated from the free electron laser emitting device 3 is controlled in accordance with a frequency determined by dividing a frequency of the commercial power source 1 (for example, 60 Hz) by the control circuit 2. For example, in the case of division by 6, the emission period is 100 ms (10 Hz) as illustrated in FIG. 2. The terahertz light 4 has an emission pulse width on the order of μs, which is extremely shorter than a time constant of about 17 ms of a terahertz sensor and a frame rate of about 16 ms of a camera.

The terahertz light 4 reflected on the sample 5 enters the terahertz camera 6, and image data 7 acquired by the terahertz camera 6 is supplied to the image processing device 8 such as a personal computer via an interface (I/F) such as a universal serial bus (USB). The terahertz camera 6 used in the embodiments has a frame rate of 59.75 Hz and an effective pixel count of 320×240.

The image data transfer rate to the image processing device 8 is set to ½ of the frame rate of the terahertz camera 6 (one of every two pieces of acquired image data is transferred). The reason why the image data transfer rate is set to ½ of the frame rate of the terahertz camera 6 is to reduce a processing load of the image processing device 8 to prevent missing of data. When the image processing device 8 has sufficiently high processing, performance, it is not necessary to reduce the image data transfer rate intentionally. Even when the image data transfer rate is ½ of the frame rate of the terahertz camera 6, no problem arises in data acquisition because this image data transfer rate is faster than the emission period of the terahertz tight 4.

The image processing device 8 of FIG. 1 is not an essential component. If the terahertz camera 6 is improved in performance in the future, the image processing for a plurality of frames performed by the image processing device 8 may be implemented inside the terahertz camera 6.

Although the imaging system 1000 of FIG. 1 is configured so that the terahertz light 4 reflected on the sample 5 enters the terahertz camera 6, the terahertz light 4 transmitted through the sample 5 may enter the terahertz camera 6.

First Embodiment

Next, a first embodiment of this invention is described in detail.

In the configuration of the embodiments illustrated in FIG. 1, when image data is acquired in time series over a plurality of frames, because the emission period of the terahertz light 4 is about ⅙ of the frame rate of the terahertz camera 6, one of every six pieces of image data acquired by the terahertz camera 6 and one of every three pieces of image data transferred to the image processing device 8 include image data involving irradiation of the terahertz light 4. For simplification, the pieces of image data transferred to the image processing device 8 are hereinafter referred to as "image data" as a representative. The frame and the frame rate are defined for an image to be acquired by the terahertz camera 6 itself.

In this embodiment, one image data involving irradiation of the terahertz light 4 is acquired for every three pieces of image data, but the acquired pieces of image data are not always the same. The reason is described below.

Figure 5:
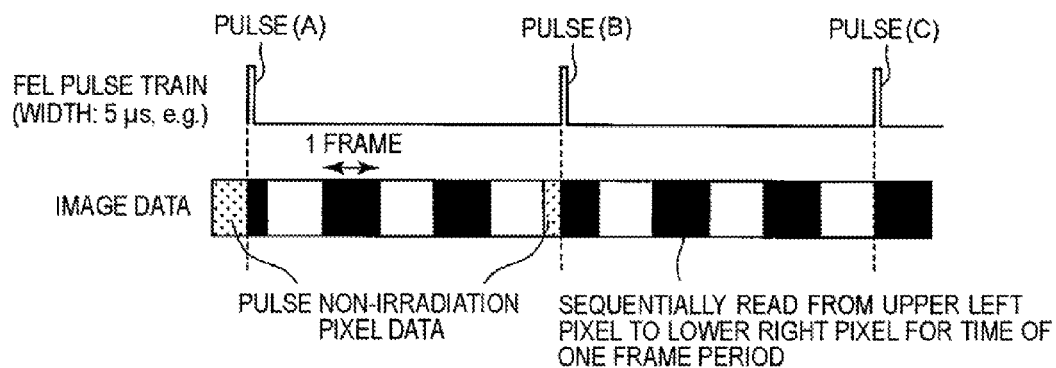
FIG. 5 is a diagram showing a relationship between an emission timing of terahertz light radiated from a free electron laser emitting device and an imaging timing of a camera.

The frame rate is not an integral multiple of the reciprocal of the emission period of the terahertz light 4 (hereinafter referred to as "emission frequency"), and hence an emission timing of the terahertz light 4 and a pixel intensity read timing become out of synchronization with time as shown in FIG. 5. Spending a time of the frame period (16.74 ms), image data is sequentially read from an upper left pixel intensity to a lower right pixel intensity. However, the emission pulse width of the terahertz light 4 is significantly shorter than the frame period.

As a result, for example, image data at an irradiation timing of a pulse (A) is sometimes read in a state in which the pixel intensities for more than half the pixels are measured under no irradiation of the pulse. Alternatively, image data at an irradiation timing of a pulse (C) is read in a state in which the pixel intensities for all pixels are measured after the irradiation of the pulse but, because the pulse width is extremely short, almost all the pixel intensities are measured after a given time has elapsed since the end of irradiation of the pulse and the elapsed time differs depending on the pixels.

The terahertz sensor has a transient response output that gradually decreases exponentially in accordance with a sensor time constant. Accordingly, the intensity of a pixel whose elapsed time until the reading is longer, that is, a pixel which is read later (lower pixel), is measured in the state of being decreased as compared to that immediately after the end of irradiation of the pulse. Consequently, even if image data over a plurality of frames is acquired, there is no image data in which all pixels have proper intensities to be observed, that is, the pixel intensities immediately after the irradiation of the pulse.

Figure 6:
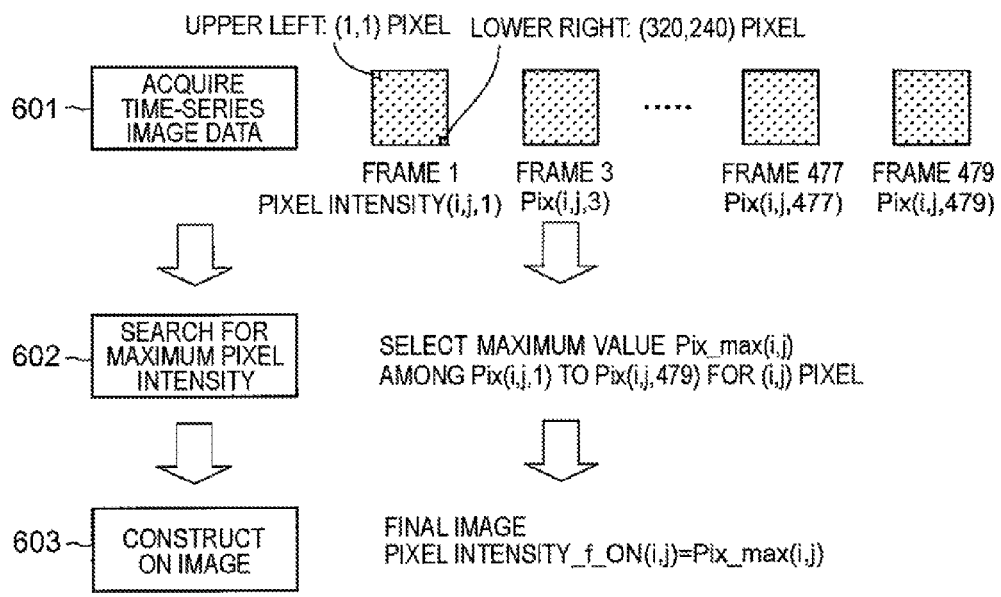
FIG. 6 is a diagram illustrating a procedure of image construction according to a first embodiment of this invention.

Referring to FIG. 6, a description is given of a procedure of acquiring image data to be originally observed according to the first embodiment of this invention.

First, time-series image data on a plurality of frames is acquired (Step 601). In this embodiment, 240 pieces of image data are acquired.

Next, from 240 pieces of image data acquired in Step 601 for each pixel, a maximum value among 240 pixel intensities is selected for each pixel and is set as the pixel intensity of the each pixel (Step 602).

Finally, one image data is constructed based on the maximum value determined in Step 602 and is set as a final image (an irradiated image, namely an ON image) (Step 603).

In the case where the effective pixel count is 320×240, when the coordinates of the upper left pixel on the image are represented by (1,1), the coordinates of the lower right pixel are represented by (320,240), and the pixel intensity at the pixel coordinates (i,j) acquired in the (2n−1)th frame is represented by Pix(i,j,2n−1), a pixel intensity Pix_f_ON(i,j) of pixels constructing the final image (irradiated image) is determined as follows.

$$\text{Pix\_f\_ON}(i,j) = \text{Pix\_max}(i,j) = \max(\text{Pix}(i,j,2n-1), n=1 \text{ to } 240) \quad \text{(Ex. 1)}$$

In Expression 1, max( ) means that a maximum value among values in parentheses is selected.

The number of pieces of image data necessary in Step 601 (240, which is an upper limit value of n; the number of frames is twice the number of pieces of data) is determined based on the emission period of the terahertz light 4 and the frame rate. In this embodiment, the pulse emission timing of the terahertz light 4 becomes out of synchronization with an image data read start time of the terahertz camera 6 by about 420 μs for each pulse irradiation. The reason is that the terahertz light emission period is 0.1 s (10 Hz) while the 6-frame period of the terahertz camera 6 is 0.100420 s (59.749/6 Hz). The period of reading image data is 33.47 ms (59.749/2 Hz), and hence, by acquiring image data corresponding to irradiation of 80 pulses (=33.47 ms/420 μs), in other words, by sequentially acquiring 3×80=240 pieces of image data including image data in the pulse-unirradiated state (the pulse-OFF state), any one of 240 pieces of image data includes the pixel intensity measured immediately after the irradiation of the pulse when a certain pixel is paid attention.

If it is assumed that all pieces of image data acquired by the terahertz camera 6 are transferred to the image processing device 8, because the period of reading image data is 16.74 ms, by acquiring image data corresponding to irradiation of 40 pulses (=16.74 ms/420 μs), in other words, by sequentially acquiring 6×40=240 pieces of image data including image data in the pulse-unirradiated state, any one of 240 pieces of image data includes the pixel intensity measured immediately after the irradiation of the pulse when a certain pixel is paid attention. A necessary number of pieces of image data does not depend on the transfer rate to the image processing device 8 but is determined based on the emission period of the terahertz light 4 and the frame rate of the terahertz camera 6 (240 in the configuration of this embodiment).

Figure 7:
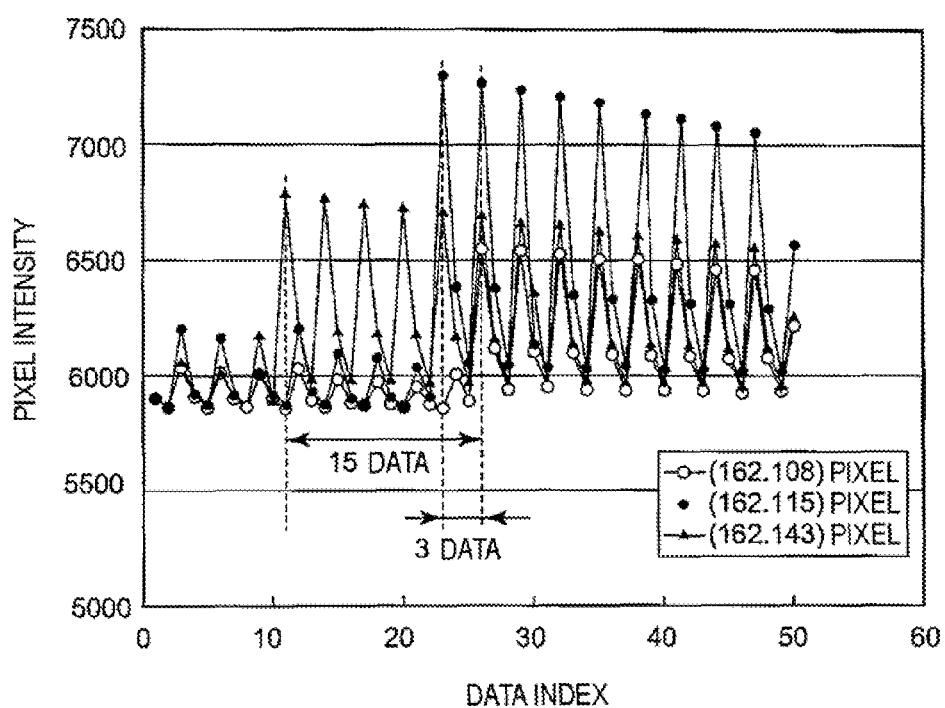
FIG. 7 is a graph showing a time-series change in pixel data over a plurality of frames obtained by observing the terahertz light radiated from the free electron laser emitting device.

FIG. 7 shows a time-series change in pixel data of three representative pixels at coordinates (162,108), (162,115), (162,143) among image data acquired under the conditions where the emission frequency and the emission pulse width of the terahertz light 4 are 10 Hz and 5 μs, respectively.

A frame showing a maximum value is different for each pixel (the horizontal axis of FIG. 7 is not the number of frames but the data index n in Expression 1). It is thus understood that image data in which all pixels have a pixel intensity measured immediately after the irradiation of terahertz light cannot be acquired from one image data. The terahertz camera 6 used in this embodiment requires a time period of about 62.7 μs to read pixel data in one line. Accordingly, when a certain pixel (i,j) is considered as a reference, a pixel (i,j−7) located seven lines before the (i,j) pixel is read 62.7×7=440 μs nearly equal to 420 μs before. Consequently, in the case where the (i,j) pixel is read immediately after the irradiation of terahertz light, the (i,j−7) pixel and pixels in its vicinity are read immediately after the next irradiation of terahertz light because the frequency of the commercial power source 1 for controlling the emission period of the terahertz light 4 is slightly higher than the frame rate of the terahertz camera 6.

As is understood from FIG. 7, which reflects this relationship, the timing at which the intensity of the (162,115) pixel becomes maximum is six frames before (three pieces of image data before) the timing at which the intensity of the (162,108) pixel becomes maximum, and the timing at which the intensity of the (162,143) pixel becomes maximum is 30 frames before (15 pieces of image data before) the timing at which the intensity of the (162,108) pixel becomes maximum.

Figure 8:
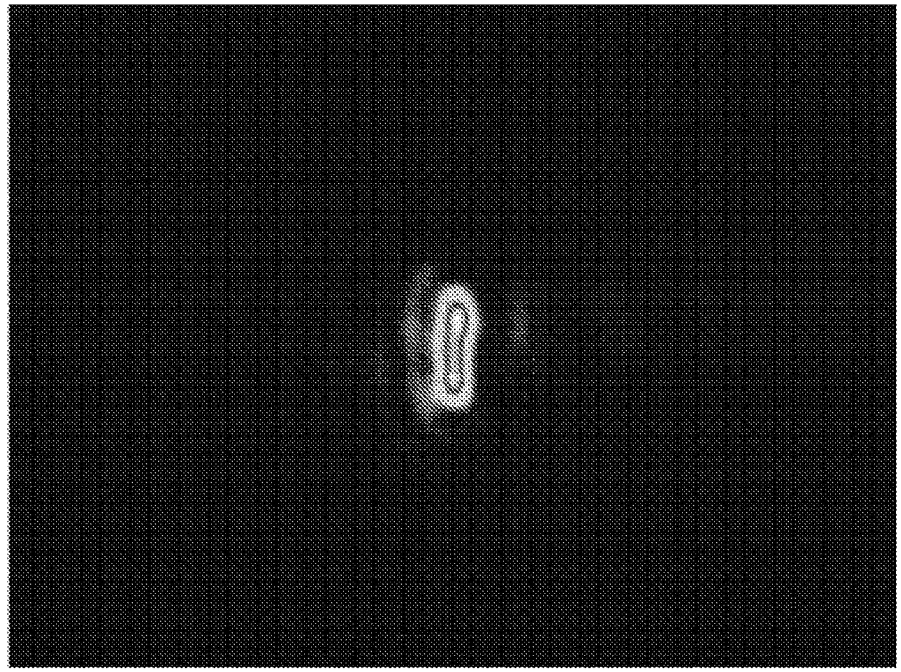
FIG. 8 is a photograph showing an example of an image acquired in the first embodiment of this invention.

FIG. 8 shows image data acquired by allocating the maximum value in 240 frames for each pixel.

Figure 9:
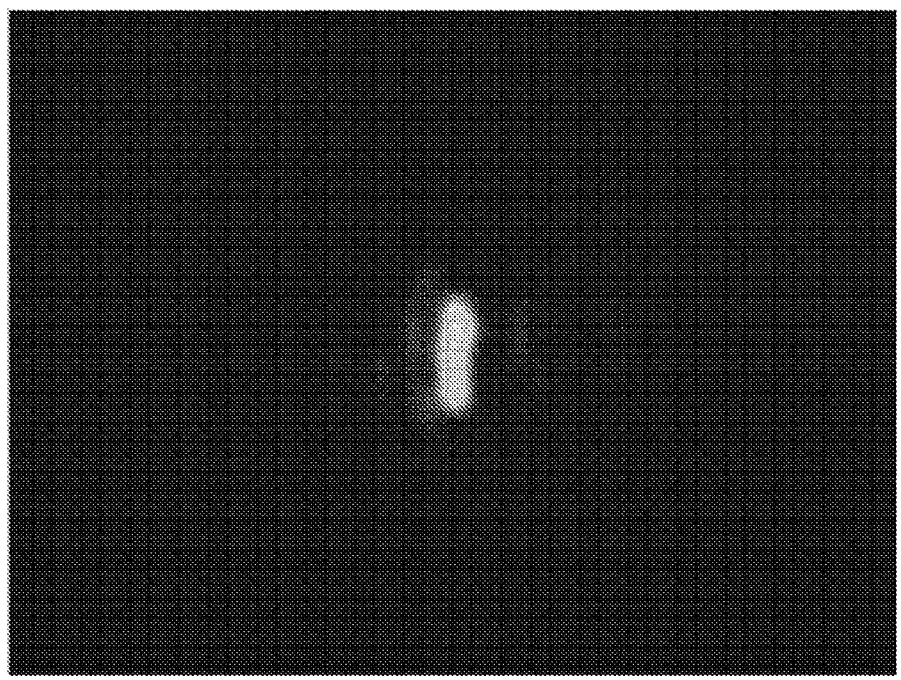
FIG. 9 is a photograph showing an example of an image acquired by the imaging, system described in Patent Literature 1.

It is understood that image contrast is improved as compared to image data of FIG. 9 acquired by the imaging system described in Patent Literature 1 (the maximum pixel intensity value of FIG. 8 is 7,300, and the maximum pixel intensity value of FIG. 9 is 6,600). It is also understood that a more fine intensity distribution can be confirmed in an image at the center. Note that, the image of FIG. 9 is a revised image obtained by enlarging the image 100 of FIG. 4 for comparison.

Second Embodiment

Next, a second embodiment of this invention is described in detail.

As a method for reducing fixed pattern noise (spatial noise) inherent in an imaging system including a sensor, the lock-in imaging technology described in Patent Literature 1 is known.

In the imaging conditions used in the first embodiment where the pixels are irradiated with the terahertz light 4 at different timings, the image quality cannot be improved even with the use of lock-in operation involving selecting a certain image as an irradiated image (an ON image) and selecting an image after a predetermined time has elapsed since an irradiated image as an unirradiated image (an OFF image) (in this embodiment, the frame interval until the irradiation of the terahertz light 4 is six frames, and hence timing of controlling not to irradiate the terahertz light 4 is regarded as four frames later).

Figure 4:
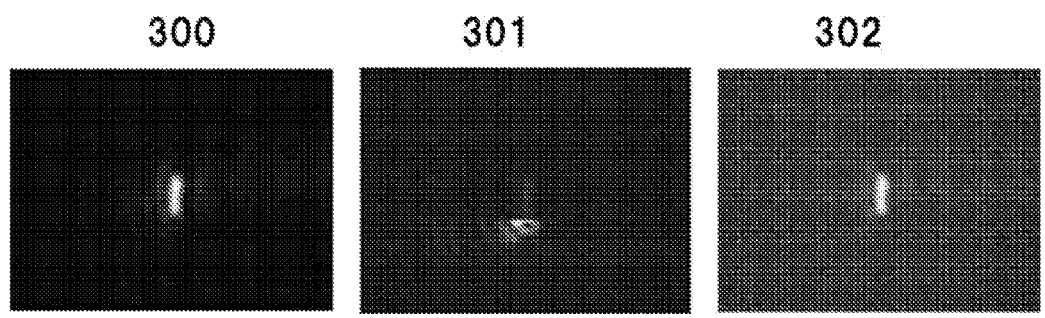
FIG. 4 are photographs showing an example of images acquired by the imaging system described in Patent Literature 1.
Figure 10:
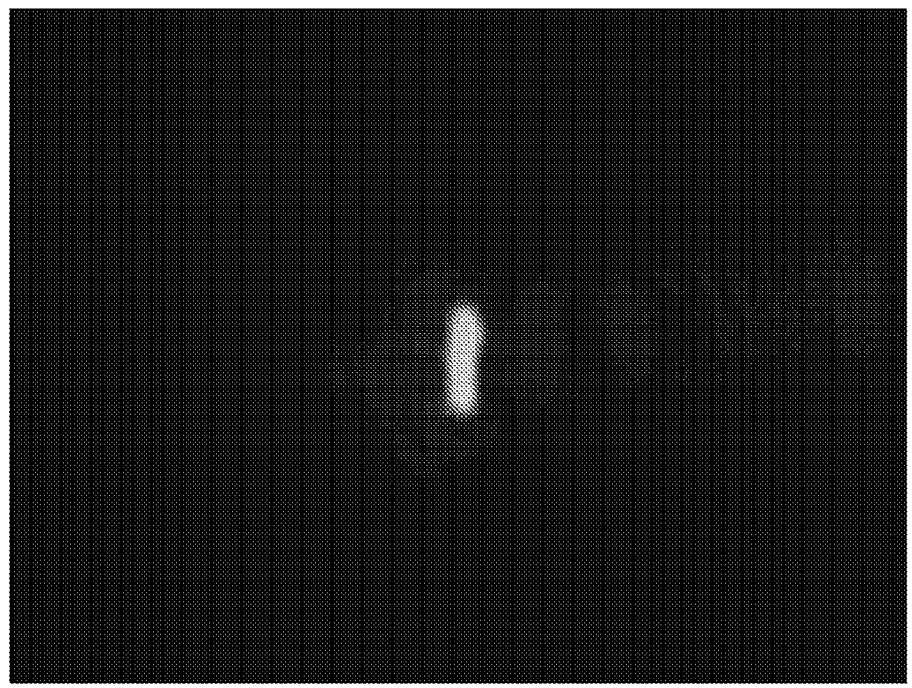
FIG. 10 is a photograph showing an example of a difference image acquired by the imaging system described in Patent Literature 1.

As an example, FIG. 10 shows a lock-in image acquired by selecting the image data 300 of FIG. 4 as an unirradiated image and selecting image data acquired four frames after the image data 300 as the unirradiated image. In this lock-in image, it is understood that a fine shape of the image is further lost as compared to the image of FIG. 4 and hence the image ends up deteriorating through difference operation.

In the second embodiment, for 240 pieces of image data acquired in the first embodiment, a pixel intensity Pix_f_OFF(i,j) of a pixel constructing image data measured when the terahertz light 4 is not irradiated (an unirradiated image) is determined as follow.

$$\text{Pix\_f\_OFF}(i,j) = \text{Pix\_min}(i,j) = \min(\text{Pix}(i,j,2n-1), n=1 \text{ to } 240) \quad \text{(Ex. 2)}$$

Figure 11:
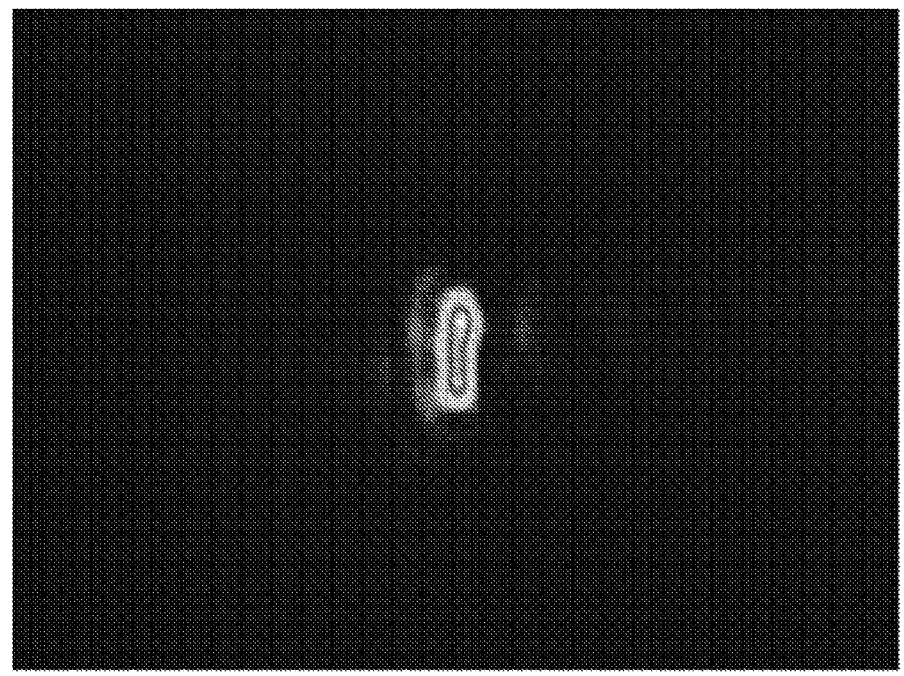
FIG. 11 is a photograph showing an example of a difference image acquired in a second embodiment of this invention.

In Expression 2, min( ) means that a minimum value among values in parentheses is selected. The minimum value corresponds to a pixel intensity measured at a time point at least five frames (almost six frames) after the irradiation of terahertz light, and is hardly affected by the irradiation of terahertz light. FIG. 11 shows a lock-in image acquired by subtracting the unirradiated image acquired in the second embodiment from the irradiated image acquired in the first embodiment. It is understood that the image is not deteriorated but almost reproduces the image of FIG. 8, as opposed to FIG. 10.

In the above, a description has been given of the method of allocating the pixel intensity in the irradiated image as the maximum value of the pixel intensity and allocating the pixel intensity in the unirradiated image as the minimum value of the pixel intensity.

In addition, an average value of pieces of data acquired in time series can be used to reduce white noise of the system. For the unirradiated image, for example, data that satisfies a certain condition from among Pix(i,j,2n−1) (where n is 1 to 240) can be averaged by using Expression 3.

$$\text{Pix}(i,j,2n-) \leq \min(\text{Pix}(i,j,2n-1), n=1 \text{ to } 240) + \Delta \quad \text{(Ex. 3)}$$

In Expression 3, although depending on the detection performance of the camera, for example, Δ may be set to about 1/100 of the pixel intensity amplitude in the irradiated image, and the pixel intensity in the unirradiated image may be acquired based on an average value of pieces of pixel data satisfying this expression.

For the irradiated image, by increasing a measurement time so as to acquire, for example, 960 pieces of image data, a local maximum intensity for each pixel may be determined in units of 240 pieces of image data, and an average value of the four (960/240=4) local maximum intensities may be determined as Pix_f_ON(i,j), By taking a difference between the thus averaged irradiated image and unirradiated image, an image having a higher signal noise ratio can be acquired.

Third Embodiment

Next, a third embodiment of this invention is described in detail.

In the above-mentioned first and second embodiments, a description has been given of the method of constructing an image by using a plurality of (240) pieces of image data. In the third embodiment, an image to be originally acquired is constructed from one image data measured through light source irradiation.

Figure 12:
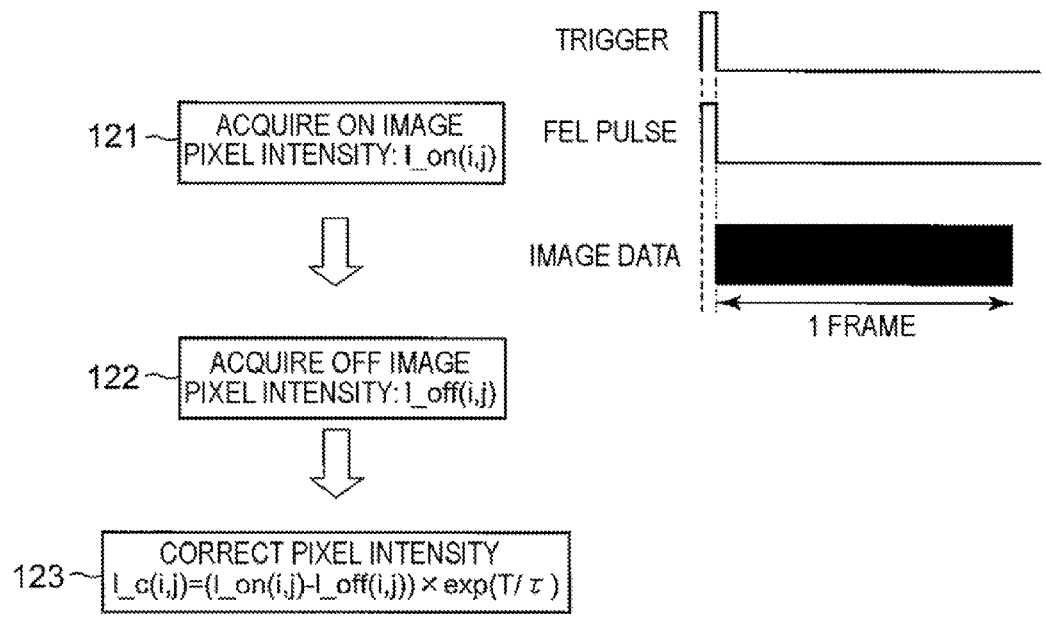
FIG. 12 is a diagram illustrating a procedure of correcting pixel intensity in consideration of a time required for pixel reading and a sensor time constant.

Referring to FIG. 12, the third embodiment is described. FIG. 12 is a diagram illustrating a procedure of correcting a pixel intensity in consideration of a time required for pixel reading and a sensor time constant.

First, first image data (ON-image data) whose elapsed time from irradiation of terahertz light is one frame period or less is acquired for all pixels by using an external trigger or the like (Step 121).

Next, the terahertz light 4 is not irradiated to acquire unirradiated image (OFF-image) data (Step 122).

Next, pixel amplitude is calculated for each pixel based on a difference between the second image data acquired in Step 121 and the second image data acquired in Step 122 to correct a pixel amplitude attenuation ratio due to the time required for reading (Step 123).

When the pixel amplitude determined in Step 123 is represented by I(i,j), the elapsed time from the start of imaging to the reading of the (i,j) pixel is represented by T(i,j), and the sensor time constant is represented by τ, a pixel intensity I_c(i,j) to be determined is expressed as follows.

$$I\_c(i,j)=I(i,j)\times\exp(T(i,j)/\tau) \quad (\text{Ex. 4})$$

Figure 13:
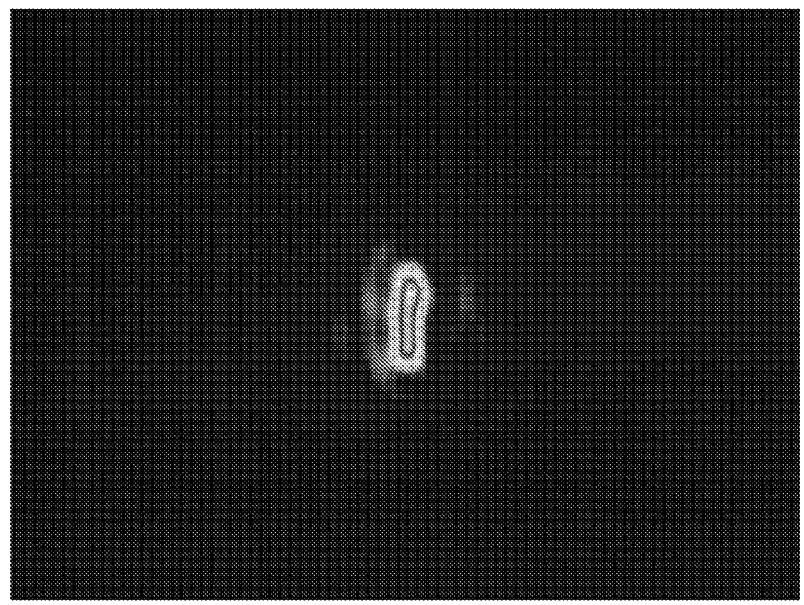
FIG. 13 is a photograph showing an example of an image acquired in a third embodiment of this invention.

FIG. 13 shows an image constructed based on I_c(i,j) determined by this method.

It is understood that an image close to the images of FIGS. 8 and 11 can be reproduced. Note that, Expression 4 corrects the intensity also including a noise component and thus the image S/N is more favorable in the image of FIG. 8 or FIG. 11, but this method has an advantage that only at least two pieces of image data are required for processing.

As described above, according to the embodiments of this invention, in the imaging system including the light source, the camera, the optical system for irradiating a sample with light from the light source, and the optical system for causing light reflected from or transmitted through the sample to enter the camera, the light source is controlled to irradiate the light with a predetermined period to acquire image data over a plurality of frames, and the maximum intensity among, time-series pixel data of each pixel is allocated as pixel data of the each pixel to acquire irradiated image measured when the light source irradiates the light.

Further, another embodiment of this invention has a feature that second image data, which is measured when the light source does not irradiate the light and is acquired by allocating the minimum intensity among the time-series pixel data as pixel data of each pixel, is subtracted from the first image data to construct lock-in difference image data.

Further, another embodiment of this invention has a feature that second image data, which is measured when the light source does not irradiate the light and is acquired by allocating an average value of pixel data lower than a predetermined value among the time-series pixel data as pixel data of each pixel, is subtracted from the first image data to construct lock-in difference image data.

Further, according to another embodiment of this invention, in the imaging system including the light source, the camera, the optical system for irradiating a sample with light from the light source, and the optical system for causing light reflected from or transmitted through the sample to enter the camera, one image data in which all pixels have pixel intensities that are measured within one frame period after the sample is irradiated with the light from the light source is acquired as first image data, and, with the use of second image data measured when the light source does not irradiate the light and the first image data, an output decrease caused by the sensor thermal time constant is corrected to construct image data.

According to the embodiments of this invention, an image to be originally acquired can be constructed even when the predetermined period of the light source and the frame period of the camera are out of synchronization (are not in an integer multiple relationship). In particular, this invention exhibits a particularly noticeable effect when the emission time period of the light source is extremely shorter than the time constant of the camera sensor.

Hereinabove, the embodiments of this invention are described in detail. However, this invention is not limited to the above-mentioned embodiments, and various modifications can be made based on the technical idea of this invention.

What is claimed is:

1. An imaging system, comprising:
   a light source;
   an imaging device;
   a first optical system for irradiating an imaging object with light from the light source;
   a second optical system for causing one of light reflected from the imaging object and light transmitted through the imaging object to enter the imaging device;
   a control device for controlling the light source to irradiate the light with a predetermined period; and
   a processing device for acquiring time-series image data over a plurality of frames by controlling the light source to irradiate the light with the predetermined period, and allocating a maximum pixel intensity among the time-series pixel data of each pixel as pixel data of the each pixel to thereby obtain first image data when the light source irradiates the light.

2. An imaging system according to claim 1, wherein the processing device is configured to obtain lock-in difference image data by subtracting second image data from the first image data, the second image data being measured when the light source does not irradiate the light and being obtained by allocating a minimum pixel intensity among the time-series pixel data as pixel data of each pixel.

3. An imaging system according to claim 1, wherein the processing device is configured to obtain lock-in difference image data by subtracting first image data from the first image data, the second image data being measured when the light source does not irradiate the light and being obtained by allocating an average pixel intensity of pixel data lower than a predetermined pixel intensity among the time-series pixel data as pixel data of each pixel.

4. An imaging system according to claim 1, wherein:
   the light source comprises a free electron laser emitting device;
   the control device is connected to a commercial power source; and
   the control device is configured to control an emission period of light radiated from the light source by using a frequency of the commercial power source.

5. An imaging system according to claim 4, wherein:
   the imaging device is configured to internally generate a frame rate frequency; and
   the emission period of the light source and the frame rate frequency do not satisfy an integral multiple relationship.

6. An imaging system according to claim 5, wherein, when the integral multiple relationship is not satisfied, a predetermined period of the light source and a frame period of the imaging device are out of synchronization.

7. An imaging system according to claim 5, wherein:
the imaging device comprises a camera sensor; and
the light source has an emission pulse width shorter than a time constant of the camera sensor.

8. An imaging system according to claim 7, wherein:
the free electron laser emitting device radiates terahertz light; and
the terahertz light has an emission pulse width on order of µs, and the camera sensor has a time constant on order of ms.

9. An imaging system according to claim 1, wherein the processing device comprises an image processing device connected to the imaging device.

10. An imaging system according to claim 1, wherein the processing device is provided inside the imaging device.

11. An imaging system, comprising:
a light source;
an imaging device;
a first optical system for irradiating an imaging object with light from the light source;
a second optical system for causing one of light reflected from the imaging object and light transmitted through the imaging object to enter the imaging device; and
a processing device for acquiring one image data in which all pixels have pixel intensities that are measured within one frame period after the imaging object is irradiated with the light as first image data, and correcting, with use of second image data when the light source does not irradiate the light and the first image data, an output decrease caused by a sensor thermal time constant of the imaging device to thereby obtain image data.

12. An imaging, system according to claim 11, wherein the first image data is obtained by using an external trigger.

13. An imaging system according to claim 11, wherein the output decrease is corrected by taking a difference between the first image data and the second image data for each pixel.

14. An imaging method, comprising:
irradiating an imaging object with predetermined light from a light source;
causing one of light reflected from the imaging object and light transmitted through the imaging object to enter an imaging device;
acquiring a predetermined number of pieces of time-series image data over a plurality of frames by controlling the light source to irradiate the light with a predetermined period;
selecting, for each pixel, a maximum pixel intensity from among the acquired predetermined number of pieces of time-series image data; and
obtaining, based on the maximum pixel intensity for the each pixel, one final image data as first image data when the light source irradiates the light.

15. An imaging method according to claim 14, wherein the predetermined number of pieces of time-series image data is determined based on an emission period of the light and a frame rate of the imaging device.

16. An imaging: method, comprising:
irradiating an imaging object with predetermined light from a light source;
causing one of light reflected from the imaging object and light transmitted through the imaging object to enter an imaging, device;
acquiring first image data when the light source irradiates the light, all pixels having pixel intensities that are measured when an elapsed time from the irradiation of the light is one frame period or less;
acquiring second image data by controlling the light source not to irradiate the light; and
taking a difference between the first image data and the second image data for each pixel to calculate pixel amplitude and correct an attenuation ratio of the pixel amplitude.

17. An imaging method according to claim 16, wherein the first image data is obtained by using an external trigger.

18. An imaging method, comprising:
irradiating an imaging object with light from a light source;
causing one of light reflected from the imaging object and light transmitted through the imaging object to enter an imaging device; and
acquiring final image data when the light source irradiates the light, under such a state that a predetermined period of the light source and a frame period of the imaging device are out of synchronization.

* * * * *